(12) United States Patent
Yaccarino

(10) Patent No.: US 8,251,022 B2
(45) Date of Patent: Aug. 28, 2012

(54) SYSTEM AND METHOD FOR STORAGE AND DELIVERY OF A FUEL ADDITIVE ON-BOARD A PLUG-IN HYBRID ELECTRIC VEHICLE

(75) Inventor: Philip A. Yaccarino, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 883 days.

(21) Appl. No.: 12/361,583

(22) Filed: Jan. 29, 2009

(65) Prior Publication Data

US 2010/0186702 A1 Jul. 29, 2010

(51) Int. Cl.
*F02B 43/00* (2006.01)
(52) U.S. Cl. .................. 123/1 A; 123/198 A
(58) Field of Classification Search .......... 123/1 A, 123/198 A
See application file for complete search history.

(56) References Cited

U.S. PATENT DOCUMENTS

| | | | | | |
|---|---|---|---|---|---|
| 4,253,436 | A | * | 3/1981 | Dudrey | 123/1 A |
| 4,568,248 | A | * | 2/1986 | Harders | 123/1 A |
| 4,596,277 | A | * | 6/1986 | Djordjevic | 123/1 A |
| 5,195,466 | A | * | 3/1993 | Schulte et al. | 123/1 A |
| 5,331,994 | A | * | 7/1994 | Bryan et al. | 123/1 A |
| 7,270,088 | B2 | | 9/2007 | Whitehall | |
| 2006/0254535 | A1 | * | 11/2006 | Valentine et al. | 123/1 A |
| 2006/0254536 | A1 | * | 11/2006 | Waters et al. | 123/1 A |
| 2007/0101969 | A1 | * | 5/2007 | Lay et al. | 123/1 A |
| 2007/0240649 | A1 | * | 10/2007 | Freeman | 123/1 A |
| 2008/0173358 | A1 | * | 7/2008 | Guldi | 137/351 |
| 2008/0275600 | A1 | | 11/2008 | Rask et al. | |

FOREIGN PATENT DOCUMENTS

FR 2668203 A1 * 4/1992
GB 2176842 A * 1/1987

* cited by examiner

*Primary Examiner* — Noah Kamen
(74) *Attorney, Agent, or Firm* — Quinn Law Group, PLLC

(57) ABSTRACT

A system for storage and delivery of a fuel additive on-board a plug-in hybrid electric vehicle having a purely electric mode of operation and a hybrid mode of operation and having a fuel tank configured to store a fuel includes a reservoir configured to store the fuel additive, a pump that delivers the fuel additive to the fuel tank, a first and second conduit, a controller that actuates the pump to deliver the fuel additive from the reservoir, an electric motor, a battery, and an internal combustion engine configured to consume the fuel during the hybrid mode of operation. A method of storing and delivering the fuel additive on-board the plug-in hybrid electric vehicle includes storing the fuel additive within the reservoir and actuating the pump via the controller to deliver the fuel additive from the reservoir to the fuel tank.

18 Claims, 2 Drawing Sheets

SYSTEM AND METHOD FOR STORAGE AND DELIVERY OF A FUEL ADDITIVE ON-BOARD A PLUG-IN HYBRID ELECTRIC VEHICLE

TECHNICAL FIELD

The present invention generally relates to fuel treatment for a vehicle, and, more specifically, to a system and method for storage and delivery of a fuel additive on-board a plug-in hybrid electric vehicle.

BACKGROUND OF THE INVENTION

As energy costs rise, conventional hybrid vehicles are becoming increasingly prevalent in the automotive market and provide an alternative to existing vehicles powered solely by internal combustion engines. One type of conventional hybrid vehicle, a diesel hybrid electric vehicle, employs a diesel-powered internal combustion engine that is assisted by a battery-powered electric motor. In operation, the diesel-powered internal combustion engine may recharge the battery and/or provide a driving force to such conventional hybrid vehicles. Therefore, importantly, both the diesel-powered internal combustion engine and/or the battery-powered electric motor may provide the driving force to conventional hybrid vehicles.

In contrast, a plug-in hybrid electric vehicle, also known as a range extended electric vehicle (REEV), employs a battery that may be recharged both from an external power source, such as household alternating current, or from an internal power source, such as a generator powered by an internal combustion engine. Therefore, if a driver of a plug-in hybrid electric vehicle never depletes the battery before recharging via the external power source, e.g., never travels outside a range where the battery requires recharging from the internal combustion engine, it is possible to never employ the internal combustion engine of the plug-in hybrid electric vehicle.

SUMMARY OF THE INVENTION

A system for storage and delivery of a fuel additive on-board a plug-in hybrid electric vehicle is provided. The plug-in hybrid electric vehicle has a purely electric mode of operation and a hybrid mode of operation and has a fuel tank configured to store a fuel. The system includes a reservoir configured to store the fuel additive and a pump that is operable to deliver the fuel additive to the fuel tank of the plug-in hybrid electric vehicle. The system also includes a first conduit in fluid communication with the reservoir and the pump, and a second conduit in fluid communication with the pump and the fuel tank of the plug-in hybrid electric vehicle. Further, the system includes a controller that actuates the pump to deliver the fuel additive from the reservoir to the fuel tank of the plug-in hybrid electric vehicle. Additionally, the system includes an electric motor, a battery, and an internal combustion engine configured to consume the fuel stored in the fuel tank of the plug-in hybrid electric vehicle during the hybrid mode of operation. The electric motor and the battery cooperate to provide a driving force to the plug-in hybrid electric vehicle during the purely electric mode of operation, and the internal combustion engine charges the battery during the hybrid mode of operation.

A method of storing and delivering the fuel additive on-board the plug-in hybrid electric vehicle includes storing the fuel additive within the reservoir and actuating the pump via the controller to deliver the fuel additive from the reservoir to the fuel tank of the plug-in hybrid electric vehicle.

A system of storing and delivering the fuel additive to the plug-in hybrid electric vehicle includes a reservoir on-board the plug-in hybrid electric vehicle configured to store the fuel additive in fuel additive flow communication with the fuel tank. The system also includes a pump configured to deliver a metered amount of the fuel additive from the reservoir to the fuel tank in response to a condition.

The systems and method minimize spoiled fuel and fuel deposits, and therefore minimize damaged fuel system equipment for plug-in hybrid electric vehicles. Furthermore, the systems and method enable excellent fuel pump operation and minimize plug-in hybrid electric vehicles disabled from spoiled fuel, especially for plug-in hybrid electric vehicles requiring minimal recharging via the internal combustion engine. Additionally, the systems and method contribute to excellent replacement and warranty costs for vehicle manufacturers. The systems and method also minimize intimidating, messy, inconvenient, time-consuming, and error-prone manual addition of fuel additives to fuel tanks of plug-in hybrid electric vehicles.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
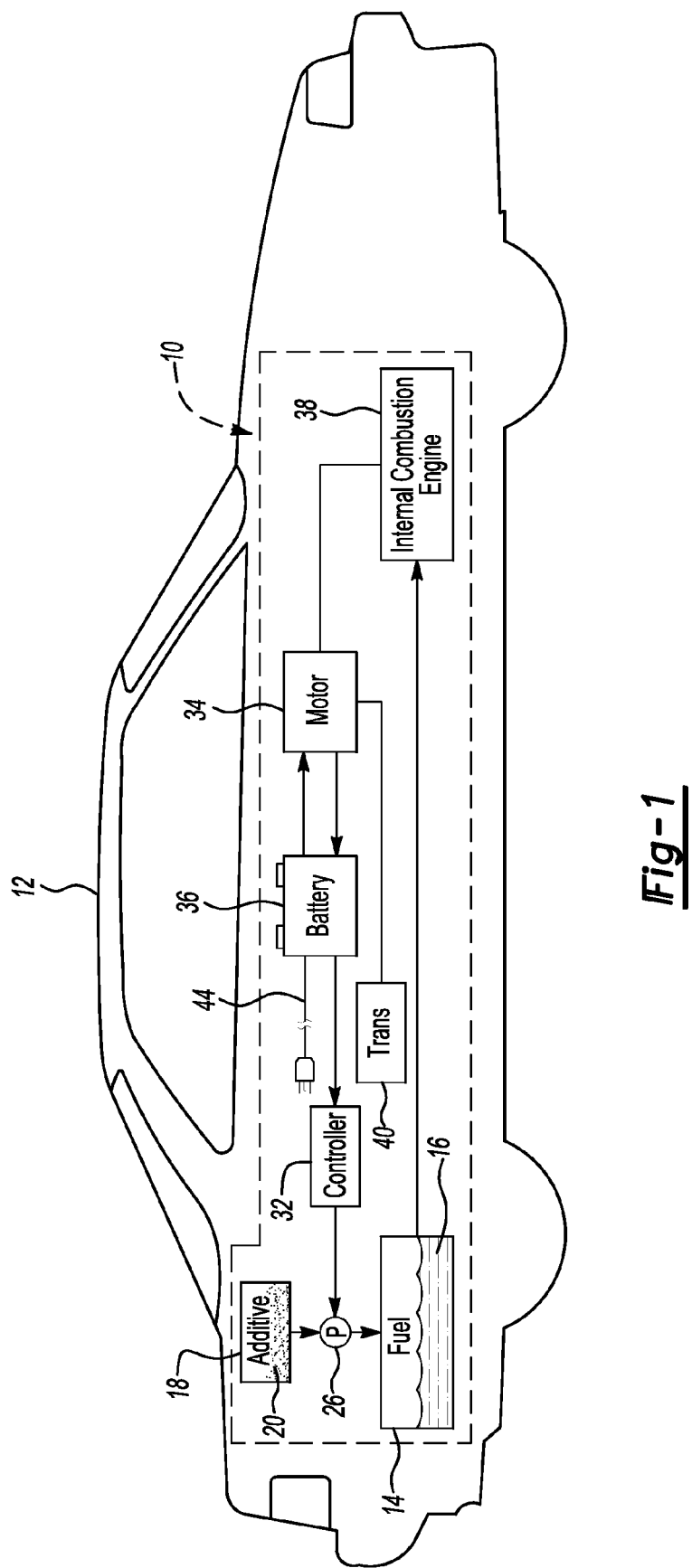
FIG. 1 is a schematic side-view illustration of an exemplary plug-in hybrid electric vehicle equipped with a system for storage and delivery of a fuel additive to a fuel tank of the plug-in hybrid electric vehicle.

Referring to the drawings, wherein like reference numerals refer to like components, a system for storage and delivery of a fuel additive on-board a plug-in hybrid electric vehicle is shown generally at 10 in FIG. 1. The system 10 of the present invention is typically useful for applications requiring automotive fuel treatment. However, it is to be appreciated that the system 10 of the present invention may also be useful for fuel treatment for non-automotive applications, such as, but not limited to, marine, aviation, power tool, landscaping equipment, and recreational vehicle applications.

Referring to FIG. 1, the system 10 is typically installed within the plug-in hybrid electric vehicle, shown generally at 12. The plug-in hybrid electric vehicle 12 has a purely electric mode of operation and a hybrid mode of operation, as set forth in more detail below, and a fuel tank 14 configured to store a fuel 16. The system 10 includes a reservoir 18 configured to store the fuel additive 20. The reservoir 18 may be of any size and shape suitable for storage of the fuel additive 20, but is typically sized to store from 0.5 to 2.5 quarts, more typically 0.75 to 1.25 quarts of the fuel additive 20. The reservoir 18 is typically formed of metal, e.g., steel, or plastic that will not corrode or react with the fuel additive 20 and is typically shaped according to available space as defined by adjacent vehicle components (not shown) of the plug-in hybrid electric vehicle 12. For example, the reservoir 18 may be generally cylindrically shaped and may include indented portions to enable placement of the reservoir 18 adjacent other vehicle components (not shown). Further, the reservoir 18 is typically spaced apart from, e.g., located greater than about five feet from, a heat source, such as, but not limited to, exhaust, heaters, friction-generating equipment, and engines, to protect the fuel additive 20 from thermal degradation. Alternatively, the reservoir 18 may be insulated or cooled.

Figure 2:
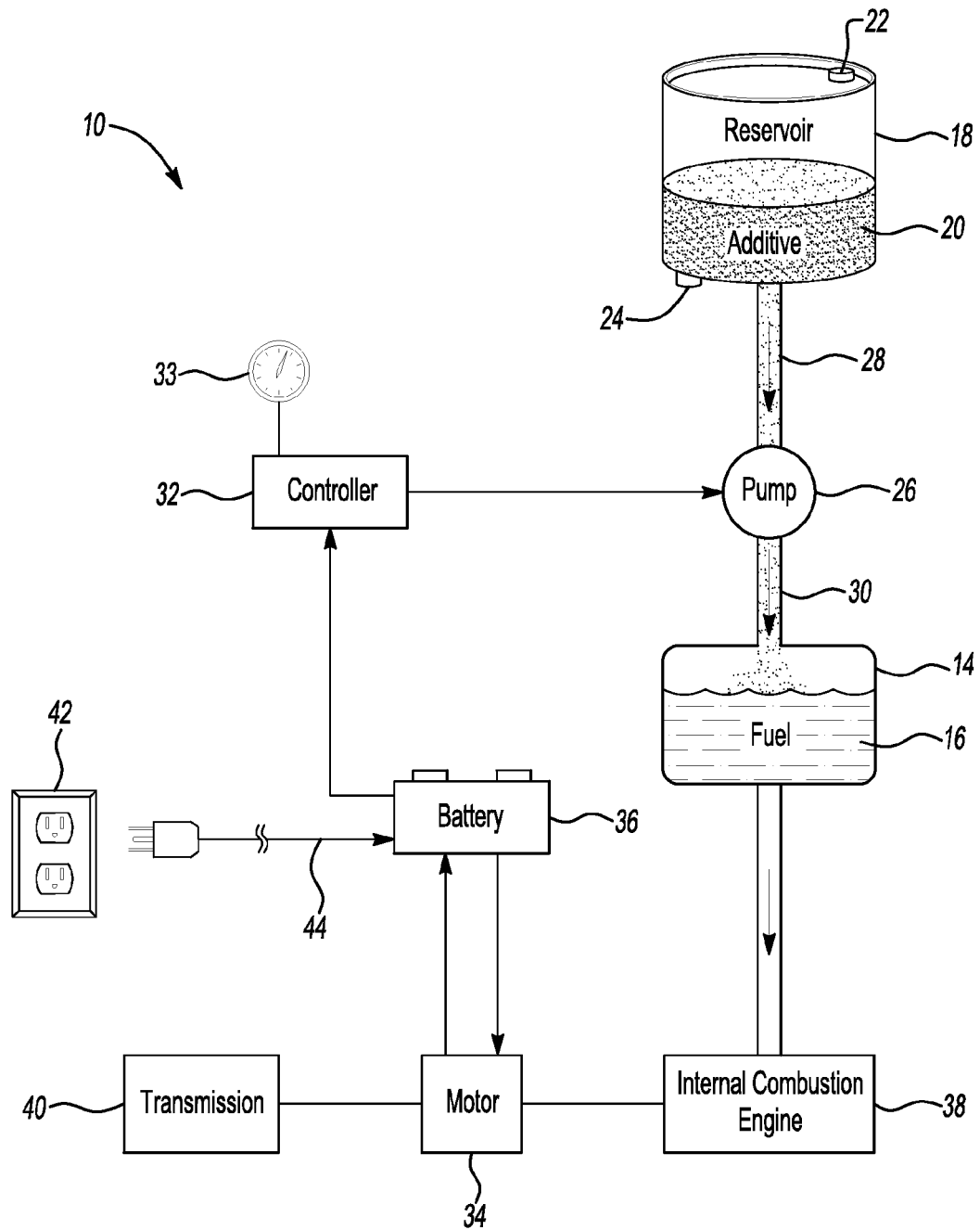
FIG. 2 is a schematic illustration of the system of FIG. 1.

Referring to FIG. 2, the reservoir 18 typically includes a filling port 22 for addition of the fuel additive 20 to the reservoir 18. In use, an operator typically adds about 1 quart of the fuel additive 20 to the reservoir 18 via the filling port 22. In one embodiment, the filling port 22 is typically covered by a vented removable cap so as to prevent the fuel additive 20 from escaping the reservoir 18. Additionally, the reservoir 18 also typically includes a drain port 24 for removing the fuel additive 20 from the reservoir 18 without delivering the fuel additive 20 to the fuel tank 14. In use, the drain port 24 is typically useful for evacuating the fuel additive 20 from the reservoir 18, for example as required during cleaning or maintenance of the reservoir 18.

Referring to FIGS. 1 and 2, the system 10 includes a pump 26 that is operable to deliver the fuel additive 20 to the fuel tank 14 of the plug-in hybrid electric vehicle 12. The pump 26 typically includes an inlet port, an outlet port, and a power source. The pump 26 may also include one or more check valves, typically installed at the inlet port and the outlet port of the pump 26 to prevent backflow of the fuel additive 20. In use, the pump 26 typically actuates to draw the fuel additive 20 into the pump 26 via the inlet port of the pump 26 and deliver the fuel additive 20 out of the pump 26 via the outlet port.

The pump 26 may be any suitable pump known in the art, such as, but not limited to a metering pump, a positive displacement pump, and a piston pump. In one embodiment, the pump 26 is a metering pump that is configured to deliver a metered amount of the fuel additive 20, as set forth in more detail below. The pump 26 is typically sized to deliver from 0.5 to 2.5 ounces of the fuel additive 20 to the fuel tank 14.

The system 10 also includes a first conduit 28 in fluid communication with the reservoir 18 and the pump 26. In use, the first conduit 28 conveys the fuel additive 20 from the reservoir 18 to the inlet port of the pump 26. The first conduit 28 may be any suitable conduit for conveying the fuel additive 20 from the reservoir 18 to the pump 26. One skilled in the art typically selects the first conduit 28 according to pump operating pressure, viscosity of the fuel additive 20, and required pumping distance. The first conduit 28 may be formed from any suitable conduit material such as, but not limited to, metal, polymer, and combinations thereof. The first conduit 28 may also be insulated to protect the first conduit 28 and the fuel additive 20 from temperature change. The first conduit 28 is typically flexible so as to permit adjustment in response to vibrations or jostling caused by operation of the plug-in hybrid electric vehicle 12. In one embodiment, the first conduit 28 is a steel-braided hose suitable for automotive applications.

The system 10 also includes a second conduit 30 in fluid communication with the pump 26 and the fuel tank 14 of the plug-in hybrid electric vehicle 12. In use, the second conduit 30 conveys the fuel additive 20 from the outlet port of the pump 26 to the fuel tank 14. The second conduit 30 may be any suitable conduit for conveying the fuel additive 20 from the pump 26 to the fuel tank 14. The second conduit 30 may be formed from any suitable conduit material such as, but not limited to, metal, polymer, and combinations thereof, and may be formed from the same or different conduit material as the first conduit 28. Additionally, the second conduit 30 may also be insulated to protect the second conduit 30 and the fuel additive 20 from temperature change. The second conduit 30 is typically flexible so as to permit adjustment in response to vibrations or jostling caused by operation of the plug-in hybrid electric vehicle 12. In one embodiment, the second conduit 30 is a steel-braided hose suitable for automotive applications.

It is further to be appreciated that suitable fittings and valves may accompany the first conduit 28 and the second conduit 30 and are to be considered as within the scope of the present invention. For example, one skilled in the art may select fittings, including washers and ties, and valves, including check valves and pressure relief valves, to accompany the first conduit 28 and the second conduit 30 of the present invention to minimize leaks and maintain adequate pumping pressure within the system 10.

The system 10 also includes a controller 32 that actuates the pump 26 to deliver the fuel additive 20 from the reservoir 18 to the fuel tank 14 of the plug-in hybrid electric vehicle 12. In use, the controller 32 typically monitors operating conditions within the system 10, which may be provided by one or more sensors (not shown) of the plug-in hybrid electric vehicle 12. Such operating conditions may include, but are not limited to, elapsed time interval since previous fuel additive addition to the fuel tank 14, temperature, fuel quality, level of the fuel tank 14, and/or level of the reservoir 18. In one embodiment, the controller 32 is a computer that provides an electronic signal to actuate the pump 26 in response to the one or more sensors of the plug-in hybrid electric vehicle 12. For example, the controller 32 may be a computer that performs calculations according to a programmed algorithm. In another embodiment, the controller 32 is a mechanical and/or hydraulic apparatus that responds to a signal provided by the one or more sensors of the plug-in hybrid electric vehicle 12 to actuate the pump 26. For example, the controller 32 may be a solenoid valve or a hydraulic piston.

The controller 32 typically automatically actuates the pump 26 according to a condition. In one embodiment, the condition is a time interval. For example, the controller 32 may actuate the pump 26 to deliver the fuel additive 20 to the fuel tank 14 after a time interval corresponding to three months has elapsed. In another embodiment, the condition is an event wherein fuel 16 is added to the fuel tank 14 of the plug-in hybrid electric vehicle 12. For example, the controller 32 may actuate the pump 26 to deliver the fuel additive 20 to the fuel tank 14 each time the plug-in hybrid electric vehicle 12 is fueled.

Upon the controller 32 actuating the pump 26, the pump 26 provides a metered amount of the fuel additive 20 to the fuel tank 14 of the plug-in hybrid electric vehicle 12. In one embodiment, the metered amount is determined by the formula (I):

$$O = V \cdot C$$

wherein O represents a volume of output of the fuel additive 20 from the pump 26, V represents a volume of fuel 16 in the fuel tank 14 of the plug-in hybrid electric vehicle 12, and C represents a ratio of volume of fuel additive 20: volume of fuel 16 in the fuel tank 14 of the plug-in hybrid electric vehicle 12. For example, commercially available fuel additives 20 typically specify a dilution ratio of fuel additive 20 to fuel 16 of about one ounce of fuel additive 20: about three gallons of fuel 16. It is to be appreciated that this dilution ratio, 1 oz/3 gal, corresponds to C in formula (I). As one example, for the fuel tank 14 fueled from empty with six gallons of fuel 16, i.e., V=6 gal, the metered amount, O, of the fuel additive 20 provided to the fuel tank 14 by the pump 26, as determined by formula (I), is about two ounces of fuel additive 20.

In yet another embodiment, the controller 32 provides a signal 33 after the plug-in hybrid electric vehicle 12 has not operated in the hybrid mode during an elapsed time interval of eleven months. That is, the controller 32 may provide the signal 33, e.g., an audible chime, a visual indicator light, or a combination of flashing headlights and a honking horn, to warn the operator that the plug-in hybrid electric vehicle 12 has only operated in purely electric mode for the prior eleven months, i.e., that the fuel 16 may be in danger of spoiling, even though the system 10 has stored and delivered a plurality of fuel additive doses to the fuel tank 14 over the prior eleven months. That is, some commercially available fuel additives are designed to only prevent fuel spoilage for about one year. It is to be appreciated that in an embodiment employing a fuel additive 20 which is designed to prevent fuel spoilage indefinitely and/or continuously refresh fuel 16, the signal 33 is not necessary.

Notably, the system 10 of the present invention includes an electric motor 34, a battery 36, and an internal combustion engine 38. During the hybrid mode of operation of the plug-in electric vehicle 12, the electric motor 34 typically receives kinetic energy from the internal combustion engine 38, transforms the kinetic energy into electrical energy, and charges the battery 36 with the electrical energy, thereby acting as a generator for the battery 36. That is, the internal combustion engine 38 charges the battery 36 during the hybrid mode of operation.

During the purely electric mode of operation of the plug-in electric vehicle 12, the electric motor 34 and the battery 36 cooperate to provide the driving force to the plug-in hybrid electric vehicle 12. That is, during the purely electric mode of operation, the battery 36 typically provides electrical energy to the electric motor 34, which in turn provides power to a transmission 40 of the plug-in hybrid electric vehicle 12, i.e., provides the driving force to the plug-in hybrid electric vehicle 12. Said differently, during the purely electric mode of operation, the plug-in hybrid electric vehicle 12 relies purely on the electric motor 34 powered by the battery 36 to provide the driving force to the plug-in hybrid electric vehicle 12. The purely electric mode is an operating condition of the plug-in hybrid electric vehicle 12 wherein the internal combustion engine 38 does not supply the driving force to the plug-in hybrid electric vehicle 12.

Therefore, it is to be appreciated that when the plug-in hybrid electric vehicle 12 operates in either the purely electric mode of operation or the hybrid mode of operation, the electrical motor 34 receives electrical energy from the battery 36 and provides power to the transmission 40 of the plug-in hybrid electric vehicle 12, thereby acting as a motor and providing the driving force to the plug-in hybrid electric vehicle 12. That is, regardless of whether the plug-in hybrid electric vehicle 12 operates in the purely electric mode of operation or the hybrid mode of operation, the internal combustion engine 38 does not provide the driving force to the plug-in hybrid electric vehicle 12 and is not directly coupled to the transmission 40 as in a conventional vehicle. Rather, the electric motor 34 provides the driving force to the plug-in hybrid electric vehicle 12 during the purely electric mode of operation and/or the hybrid mode of operation. The electric motor 34 may be any suitable electric motor known in the art that is configured to operate both as a generator and a motor, and is typically sized to provide adequate charging of the battery 36 during peak loads during the hybrid mode of operation.

The battery 36 is configured to be charged via the electric motor 34 and/or a power source 42 external to the plug-in hybrid electric vehicle 12. It is to be appreciated that the term "battery" as used herein represents one or more than one device including a combination of two or more electrically connected electrochemical cells that store electric energy. Further, as used herein, the term "battery" refers to one or more than one such device, battery packs, battery systems, and combinations thereof. For example, in one embodiment, the system 10 includes multiple batteries 36, such as at least one high-voltage battery and/or at least one low-voltage battery. In this embodiment, the at least one high-voltage battery typically provides high-voltage direct current power to a heating, ventilation, and air conditioning compressor (not shown) of the plug-in hybrid electric vehicle 12. Moreover, the low-voltage battery typically provides low-voltage direct current to components and systems of the plug-in hybrid electric vehicle 12 such as fans, pumps, and valves (not shown). Similarly, in another embodiment, the system 10 may include multiple batteries arranged in series or in parallel to form a battery pack or a battery system.

As set forth above, during the hybrid mode of operation, the internal combustion engine 38 consumes the fuel 16 in the fuel tank 14 of the plug-in hybrid electric vehicle 12 to provide kinetic energy to the electric motor 34, which in turn provides electrical energy for charging the battery 36. The battery 36 may also be charged via the power source 42 external to the plug-in hybrid electric vehicle 12. For example, the power source 42 may be household alternating current. In this embodiment, the plug-in hybrid electric vehicle 12 typically includes an umbilical cord 44 for connecting the plug-in hybrid electric vehicle 12 to the power source 42.

In another embodiment, power may also be transferred from the power source 42 to the battery 36 via induction, such as by coils (not shown). In this embodiment, at least one coil is mounted on the plug-in hybrid electric vehicle 12 and at least one coil is mounted remotely from the plug-in hybrid electric vehicle 12, such as below a surface of a garage floor. By employing the coils to inductively charge the battery 36, no physical connection between the power source 42 and the plug-in hybrid electric vehicle 12 is required.

One skilled in the art typically selects the battery 36 based on features such as, but not limited to, capacity, weight, voltage, and rechargeability. For example, the battery 36 may be selected based on an energy-to-weight ratio and a rate of loss of charge when not in use. The battery 36 of the present invention is typically a lithium-ion battery.

The system 10 may further include auxiliary battery components such as, but not limited to, battery heaters and battery chargers. Battery heaters are typically configured to warm the battery 36 to prevent damage to the battery 36 from low-temperature environments. Battery chargers are typically configured to accept power from the power source 42 and provide electrical energy to the battery 36 for charging.

The internal combustion engine 38 is configured to consume the fuel 16 stored in the fuel tank 14 of the plug-in hybrid electric vehicle 12 and provide kinetic energy to the electric motor 34 for charging of the battery 36 during the hybrid mode of operation. The internal combustion engine 38 may be any suitable internal combustion engine known in the art, but is typically a spark-ignited or compression-ignited engine having a cylinder block defining a plurality of cylinders (not shown). Each of the plurality of cylinders at least partially defines a variable volume combustion chamber (not shown). A mixture of intake air and the fuel 16 is burned within the variable volume combustion chambers to consume the fuel 16. Products of combustion are then exhausted from the internal combustion engine 38 through an exhaust manifold (not shown).

In one embodiment, the plug-in hybrid electric vehicle 12 includes a diesel engine. In this embodiment, the fuel 16 is typically selected from the group of diesel, biodiesel, biomass-to-liquid diesel, gas-to-liquid diesel, coal-to-liquid diesel, ultra-low sulfur diesel, and combinations thereof. In another embodiment, the plug-in hybrid electric vehicle 12 includes a gasoline-powered engine. In this embodiment, the fuel 16 is typically selected from the group of gasoline, ethanol, oil, hydrogen, and combinations thereof.

As set forth above, the internal combustion engine 38 of the system 10 does not provide the driving force to the plug-in hybrid electric vehicle 12 and is not directly coupled to the transmission 40 of the plug-in hybrid electric vehicle 12. Rather, the internal combustion engine 38 is only employed during the hybrid mode of operation to provide kinetic energy to the electric motor 34 for charging the battery 36, such as, for example, when a state of charge of the battery 36 drops below a predetermined level or the operator torque request is greater than that can be provided by the electric motor 34. A suitable example of an internal combustion engine 38 for the purposes of the present invention is a one liter, three cylinder internal combustion engine.

Since the internal combustion engine 38 of the system 10 may never be relied upon to charge the battery 36 of the plug-in hybrid electric vehicle 12, such as in an embodiment where the plug-in hybrid electric vehicle 12 does not operate in hybrid mode, the system 10 stores and delivers the fuel additive 20 to the fuel tank 14 of the plug-in hybrid electric vehicle 12 to minimize spoiled fuel. The fuel additive 20 may be any fuel additive known in the art, but is typically selected from the group of antioxidants, corrosion inhibitors, lubricators, metal deactivators, oxygenates, combustion catalysts, burn rate modifiers, polymerizers, stabilizers, demulsifiers, biocides, detergents, catalyst additives, anti-knock agents, lead scavengers, colorants, nitromethane, tetranitromethane, vaporization additives, anti-foaming agents, and combinations thereof. Examples of suitable antioxidants include butylated hydroxytoluene, 2,4-dimethyl-6-tert-butylphenol, 2,6-di-tert-butylphenol, phenylene diamine, ethylene diamine, and combinations thereof. Examples of suitable oxygenates include alcohols such as methanol, ethanol, isopropyl alcohol, n-butanol, and gasoline-grade t-butanol; and ethers such as methyl tert-butyl ether, tertiary amyl methyl ether, tertiary hexyl methyl ether, ethyl tertiary butyl ether, tertiary amyl ethyl ether, diisopropyl ether, and combinations thereof. Examples of suitable antiknock agents include tetra-ethyl lead, methylcyclopentadienyl manganese tricarbonyl, ferrocene, iron pentacarbonyl, toluene, isooctane, and combinations thereof. Examples of suitable lead scavengers include tricresyl phosphate, 1,2-dibromoethane, 1,2-dichloroethane, and combinations thereof. Examples of suitable fuel dyes include Solvent Red 24, Solvent Red 26, Solvent Yellow 124, and Solvent Blue 35. A suitable fuel additive 20 for the purposes of the present invention is STA-BIL®, commercially available from Gold Eagle Company of Chicago, Ill.

The present invention also includes a method of storing and delivering the fuel additive 20 on-board the plug-in hybrid electric vehicle 12. As used herein, the term "on-board" represents an arrangement wherein the reservoir 18 is physically attached to the plug-in hybrid electric vehicle 12. For example, in one embodiment, the reservoir 18 may be bolted to the plug-in hybrid electric vehicle 12.

The method includes storing the fuel additive 20 within the reservoir 18. As set forth above, the fuel additive 20 is typically stored within the reservoir 18 for less than or equal to about one year, although the actual storage time may be greater or less than one year, according to fuel additive manufacturer recommendations. In the event that the maximum fuel additive storage time is exceeded, the method optionally includes removing the fuel additive 20 from the reservoir 18. Also as set forth above, the fuel additive 20 is typically removed from the reservoir 18 via the drain port 24 of the reservoir 18.

The method also includes actuating the pump 26 via the controller 32 to deliver the fuel additive 20 from the reservoir 18 to the fuel tank 14 of the plug-in hybrid electric vehicle 12. In one embodiment, actuating the pump 26 provides a signal from the controller 32 to the pump 26 according to a condition that is a time interval. In another embodiment, actuating provides a signal from the controller 32 to the pump 26 according to a condition that is an event wherein fuel 16 is added to the fuel tank 14 of the plug-in hybrid electric vehicle 12. Moreover, actuating the pump 26 typically delivers the metered amount of the fuel additive 20 as determined by formula (I), as set forth above.

In one embodiment, as set forth above, the method further includes providing a signal 33 from the controller 32 to the pump 26 when the plug-in hybrid electric vehicle 12 has not operated in the hybrid mode during an elapsed time interval of eleven months. In this embodiment, as set forth above, since some commercially available fuel additives are designed to only prevent fuel spoilage for about one year, the controller 32 signals an operator of impending fuel spoilage. It is to be appreciated that in an embodiment employing a fuel additive 20 which is designed to prevent fuel spoilage indefinitely, the signal 33 is not necessary.

The present invention also includes a system of storing and delivering the fuel additive 20 to the plug-in hybrid electric vehicle 12. The system includes the reservoir 18 on-board the plug-in hybrid electric vehicle 12 configured to store the fuel additive 20 in fuel additive flow communication with the fuel tank 14. As used herein, the terminology "fuel additive flow communication" represents an arrangement, as set forth above, wherein the fuel additive 20 flows from the reservoir 18 to the fuel tank 14. For example, in this embodiment, the fuel additive 20 flows via the first conduit 28, the pump 26, and the second conduit 30. Stated differently, the reservoir 18 is in fuel additive flow communication with the fuel tank 14 via the first conduit 28, the pump 26, and the second conduit 30. However, it is to be appreciated that other equipment, e.g., channels, piping, tubing, valves, pressure regulators, and insulation, useful for establishing fuel additive flow communication is contemplated to be within the scope of the present invention.

The system also includes a pump configured to deliver the metered amount of the fuel additive 20 from the reservoir 18 to the fuel tank 14 in response to a condition. Delivering the metered amount is typically effected via the pump 26 of the system 10 set forth above, and the metered amount is typically determined according to formula (I), also set forth above.

In one embodiment, the condition is the time interval. For example, the controller 32 may actuate the pump 26 to deliver the fuel additive 20 to the fuel tank 14 after a time interval corresponding to three months has elapsed. In another embodiment, the condition is an event wherein fuel 16 is added to the fuel tank 14 of the plug-in hybrid electric vehicle 12. For example, the controller 32 may actuate the pump 26 to deliver the fuel additive 20 to the fuel tank 14 each time the plug-in hybrid electric vehicle 12 is fueled.

The systems and method minimize spoiled fuel and fuel deposits, and therefore minimize damaged fuel system equipment for plug-in hybrid electric vehicles 12. Furthermore, the systems and method enable excellent fuel pump operation and minimize plug-in hybrid electric vehicles 12 disabled from spoiled fuel, especially for plug-in hybrid electric vehicles 12 requiring minimal recharging via the external power source 42. Additionally, the systems and method contribute to excellent replacement and warranty costs for plug-in hybrid electric vehicle manufacturers. The systems and method also minimize intimidating, messy, inconvenient, time-consuming, and error-prone manual addition of fuel additives 20 to fuel tanks 14 of plug-in hybrid electric vehicles 12 because the fuel additive 20 is on-board the plug-in hybrid electric vehicle 12.

While the best modes for carrying out the invention have been described in detail, those familiar with the art to which this invention relates will recognize various alternative designs and embodiments for practicing the invention within the scope of the appended claims.

The invention claimed is:

1. A system for storage and delivery of a fuel additive on-board a plug-in hybrid electric vehicle having a purely electric mode of operation and a hybrid mode of operation and having a fuel tank configured to store a fuel, said system comprising:
   a reservoir configured to store the fuel additive;
   a pump that is operable to deliver the fuel additive to said fuel tank of said plug-in hybrid electric vehicle;
   a first conduit in fluid communication with said reservoir and said pump;
   a second conduit in fluid communication with said pump and said fuel tank of said plug-in hybrid electric vehicle;
   a controller that actuates said pump to deliver the fuel additive from said reservoir to said fuel tank of said plug-in hybrid electric vehicle, wherein said controller provides a signal after said plug-in hybrid electric vehicle has not operated in said hybrid mode during an elapsed time interval of eleven months;
   an electric motor;
   a battery configured to be charged via said electric motor and/or a power source external to said plug-in hybrid electric vehicle; and
   an internal combustion engine configured to consume the fuel stored in said fuel tank of said plug-in hybrid electric vehicle and provide kinetic energy to said electric motor for charging of said battery during said hybrid mode of operation;
   wherein said electric motor and said battery cooperate to provide a driving force to said plug-in hybrid electric vehicle during said purely electric mode of operation; and
   wherein said internal combustion engine charges said battery during said hybrid mode of operation.

2. The system of claim 1, wherein said internal combustion engine is a diesel engine.

3. The system of claim 1, wherein the fuel is selected from the group of diesel, biodiesel, biomass-to-liquid diesel, gas-to-liquid diesel, coal-to-liquid diesel, ultra-low sulfur diesel, and combinations thereof.

4. The system of claim 1, wherein the fuel is selected from the group of gasoline, ethanol, oil, hydrogen and combinations thereof.

5. The system of claim 1, wherein the fuel additive is selected from the group of antioxidants, corrosion inhibitors, lubricators, metal deactivators, oxygenates, combustion catalysts, burn rate modifiers, polymerizers, stabilizers, demulsifiers, biocides, detergents, catalyst additives, anti-knock agents, lead scavengers, colorants, nitromethane, tetranitromethane, vaporization additives, anti-foaming agents, and combinations thereof.

6. The system of claim 1, wherein said purely electric mode is an operating condition of said plug-in hybrid electric vehicle wherein said internal combustion engine does not supply the driving force to said plug-in hybrid electric vehicle.

7. The system of claim 1, wherein said controller automatically actuates said pump according to a condition.

8. The system of claim 7, wherein said condition is a time interval.

9. The system of claim 7, wherein said condition is an event wherein fuel is added to said fuel tank of said plug-in hybrid electric vehicle.

10. The system of claim 7, wherein said pump provides a metered amount of the fuel additive to said fuel tank of said plug-in hybrid electric vehicle.

11. The system of claim 10, wherein said metered amount is determined by the formula (I):

$$O = V \cdot C$$

wherein O represents a volume of output of the fuel additive from said pump, V represents a volume of fuel in said fuel tank of said plug-in hybrid electric vehicle, and C represents a ratio of volume of fuel additive to volume of fuel in said fuel tank of said plug-in hybrid electric vehicle.

12. A method of storing and delivering a fuel additive on-board a plug-in hybrid electric vehicle having a purely electric mode of operation and a hybrid mode of operation and having a fuel tank configured to store a fuel, said method comprising:
   storing the fuel additive within a reservoir;
   actuating a pump via a controller to deliver the fuel additive from the reservoir to the fuel tank of the plug-in hybrid electric vehicle; and
   providing a signal from the controller to the pump when the plug-in hybrid electric vehicle has not operated in said hybrid mode during an elapsed time interval of eleven months.

13. The method of claim 12, wherein actuating the pump provides a signal from the controller to the pump according to a condition that is a time interval.

14. The method of claim 12, wherein actuating provides a signal from the controller to the pump according to a condition that is an event wherein fuel is added to the fuel tank of the plug-in hybrid electric vehicle.

15. The method of claim 12, wherein actuating the pump delivers a metered amount of the fuel additive as determined by the formula (I):

$$O = V \cdot C$$

wherein O represents a volume output of the fuel additive from the pump, V represents a volume of fuel in the fuel tank of the plug-in hybrid electric vehicle, and C represents a ratio of volume of fuel additive to volume of fuel in the fuel tank of the plug-in hybrid electric vehicle.

16. The method of claim 12, wherein the plug-in hybrid electric vehicle includes a diesel engine.

17. The method of claim 12, wherein the purely electric mode is an operating condition of the plug-in electric hybrid vehicle wherein an internal combustion engine does not supply the driving force to the plug-in hybrid electric vehicle.

18. A system of storing and delivering a fuel additive to a plug-in hybrid electric vehicle having a purely electric mode of operation and a hybrid mode of operation and having a fuel tank configured to store a fuel, said system comprising:
   a reservoir on-board the plug-in hybrid electric vehicle configured to store the fuel additive in fuel additive flow communication with the fuel tank;

a pump configured to deliver a metered amount of the fuel additive from the reservoir to the fuel tank in response to a condition; and a controller that actuates said pump to deliver the fuel additive from said reservoir to said fuel tank, wherein said controller provides a signal after said plug-in hybrid electric vehicle has not operated in said hybrid mode during an elapsed time interval of eleven months.

* * * * *